May 4, 1965 C. HADDAD 3,181,641
VEHICLE SUSPENSION
Filed Jan. 2, 1962 2 Sheets-Sheet 1
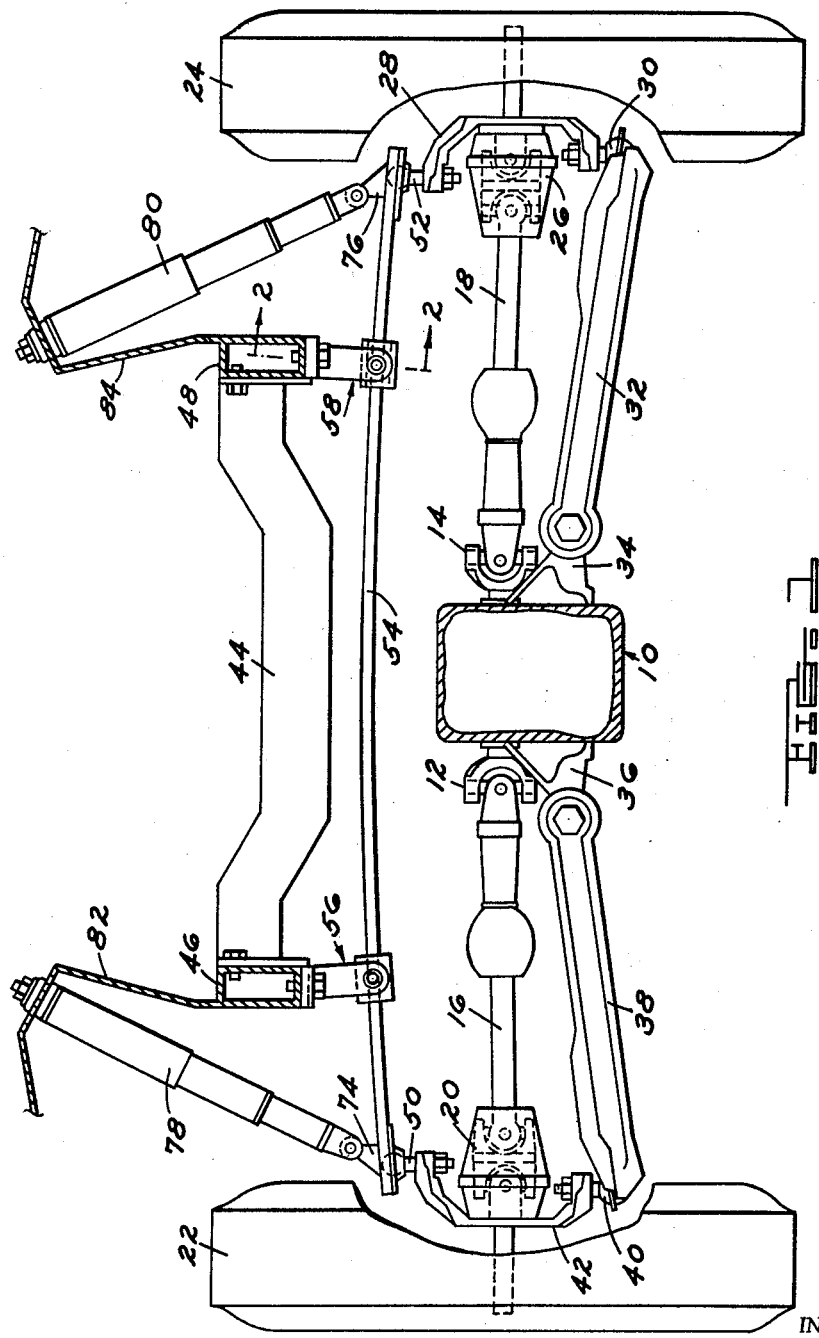
INVENTOR.
CHARLES HADDAD
BY John R. Faulkner
Clifford L. Sadler
ATTORNEYS

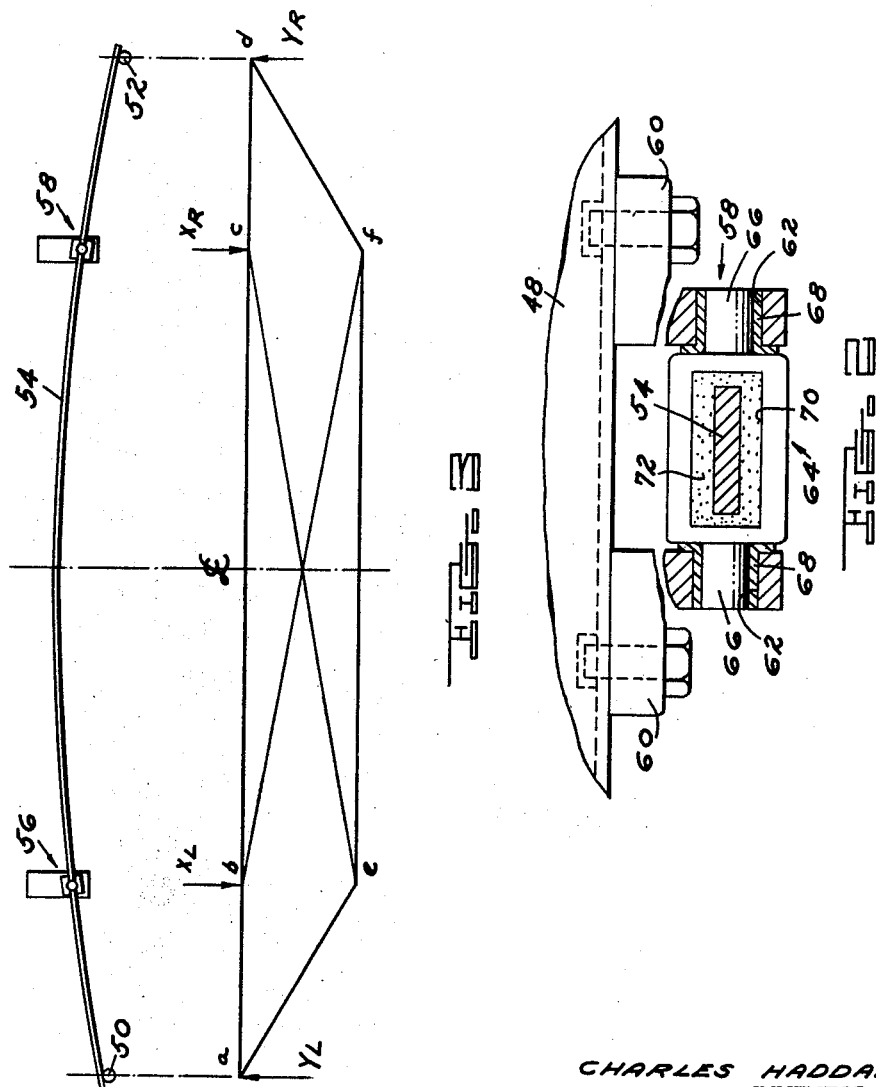

United States Patent Office 3,181,641
Patented May 4, 1965

3,181,641
VEHICLE SUSPENSION
Charles Haddad, Detroit, Mich., assignor to Ford Motor
Company, Dearborn, Mich., a corporation of Delaware
Filed Jan. 2, 1962, Ser. No. 163,574
3 Claims. (Cl. 180—42)

The present invention relates generally to vehicle suspension systems and more particularly to such systems employing a leaf spring.

In developing a suspension system having a leaf spring, it is the general objective of the designer to provide a suspension construction in which the spring element has a constant unit stress throughout its length. A spring with an even distribution of load makes maximum efficient use of the spring metal. In order to satisfy this objective, it has been the practice to provide a leaf spring assembly made up of a plurality of individual spring leaves of varying length or to provide a single leaf spring of tapered design. Both of these solutions provide added spring metal where the loading is greatest. Examples of such suspension constructions include the Hotchkiss type suspension where the spring is suspended in beam fashion between two chassis mounts and rigidly connected at a midpoint to a wheel support member or a transverse leaf spring that is rigidly connected to a central chassis mount and to left and right wheel support members.

In view of the state of the art, it is the principal object of the present invention to provide a suspension design having a leaf spring with constant cross-sectional dimensions throughout its length and in which the spring carries a uniform unit stress through a major portion of its length.

The principal advantage of such a suspension construction is the simplification of the manufacturing processes necessary to fabricate the spring with a resulting economic saving.

In one specific embodiment of this invention, a single leaf transverse spring is connected at its outer ends to left and right wheel support members and pivotally connected to a pair of chassis mounts that are spaced apart by a maximum dimension permitted by the particular vehicle involved. The portion of the spring between the two chassis mounts under such conditions will have a constant stress.

The objects and advantages of the present invention will become apparent from the following description and the accompanying drawing in which:

FIGURE 1 is a front elevational view, partly in section, of a motor vehicle incorporating the present invention;

FIGURE 2 is a sectional view taken along section lines 2—2 of FIGURE 1 of the chassis mount for the suspension spring, and;

FIGURE 3 is a diagrammatic view of the stress loading within the suspension spring.

Referring now to the drawings where the presently preferred embodiment of the invention is disclosed, FIGURE 1 shows a vehicle front suspension system. The invention is shown incorporated in a front wheel drive vehicle but is applicable to other installations.

A drive aggregate 10 having left and right power output members 12 and 14 is provided. In one contemplated construction, the drive aggregate 10 comprises an engine, a differential and a transmission that have their housings rigidly connected. The output members 12 and 14 are connected through universal joints to left and right half shafts 16 and 18. A left universal joint 20 connects the shaft 16 to a steerable road wheel 22. A right wheel 24 is operatively attached to the right shaft 18 by universal joint 26.

A wheel spindle 28 rotatably supports the hub of the wheel 24. The inner end of a lower suspension arm 32 is pivotally connected to a bracket 34 extending from the drive aggregate 10. The outer end of the lower arm 32 is connected to a ball joint 30 carried by the wheel spindle 28. The structure at the left side is similarly arranged. A bracket 36 pivotally supports a lower arm 38 from the drive aggregate 10. The outer end of the arm 38 is coupled to a ball joint 40 that is carried by a wheel spindle 42. The spindle 42 rotatably supports the hub of the left wheel 22.

The drive aggregate 10 is resiliently mounted upon chassis structure of the vehicle. In order to provide the necessary control over wheel movement, the mount of the drive aggregate 10 upon the chassis is of a type that permits relative vertical movement through a short distance but highly restricts any tendencies toward lateral movement.

A portion of the vehicle chassis structure is disclosed in FIGURE 1 and includes a cross frame member 44 that interconnects left and right side rails 46 and 48.

The upper ends of the wheel spindles 42 and 28 carry ball joint assemblies 50 and 52 respectively. These ball joint assemblies 50 and 52 are interconnecting by a single leaf transverse spring 54 that extends laterally from one wheel spindle to the other. A pair of spaced apart chassis mounts 56 and 58 join the leaf spring 54 to the left and right side rails 46 and 48.

The construction of the right mount 58 is disclosed in FIGURE 2. The left mount 56 is of similar design. A pair of bracket members 60 are bolted to the side rail 48 and have depending portions with aligned openings 62. A swivel member 64 has a pair of pivot portions 66 positioned within the openings 62 and rotatably supported by bearing members 68. The swivel 64 has a rectangular transversely extending opening 70 containing a rubber element 72 that surrounds the leaf spring 54. The rubber element 72 isolates vibrations associated with the running gear and the leaf spring from the vehicle chassis and the passenger carrying body connected thereto. The chassis mounts 56 and 58 permit the spring 54 to deflect as the wheels 22 and 24 traverse jounce and rebound paths without imparting a bending moment to it.

A pair of left and right pivot brackets 74 and 76 are secured to the outer ends of the spring 54 above its connection with the ball joint assemblies 50 and 52. Left and right telescopic shock absorbers 78 and 80 have their lower ends joined to the pivot brackets 74 and 76. Reinforced sheet metal structure 82 and 84 extends above the frame side rails 46 and 48 and the upper ends of the shock absorbers 78 and 80 are secured to that structure.

The upper portion of FIGURE 3 discloses a schematic representation of the leaf spring 54 and the left and right pivotal chassis mounts 56 and 58. The wheel loads carried by the leaf spring 54 are transmitted through the left and right ball joint assemblies 50 and 52.

The lower portion of FIGURE 3 is a stress diagram showing the amount of stress within the spring 54 when the vehicle is under static designed conditions. The weight of the sprung mass is supported by the spring and is represented by the force arrows $X_L$ and $X_R$. These forces are equal and represent the forces at the left and right chassis mounts 56 and 58. The outer ends of the spring 54 are supported by the unsprung components and are represented by arrows $Y_L$ and $Y_R$. Because the vehicle is substantially symmetrical the forces $Y_L$ and $Y_R$, which represent the wheel loads, are equal. The load or force $X_L$ imposes a stress upon the spring 54 represented by the triangle $ace$. The point of maximum stress is located at the application point of the load as indicated by the dimension $be$. Similarly, the force $X_R$ loads the right-hand portion of the spring 54 and the stress distribution from that force is represented by the triangle $bdf$.

To consider the total stress distribution present in the spring 54, the sum is taken of the two triangles *ace* and *bdf* which results in the trapezoid *adfe*. The stress distribution indicated by the resulting trapezoid *adfe* discloses a constant level of stress between the chassis mounts 56, 58. Thus it is observed that a suspension system is provided having a leaf spring with a constant unit stress through a major portion of its length without the employment of multiple leaves or a non-constant cross-sectional configuration.

By attaching the spring 54 at the side rails 46, 48 the center section bends for movement of either wheel. In a roll condition, the wheels move in opposite directions which effectively reduces the center section of the spring by one-half. This provides an increase in roll wheel rate. This arrangement provides a sway-bar effect without the usual disadvantage of increasing the wheel rate for a one-wheel bump.

The foregoing description constitutes the presently preferred embodiment of this invention. Modifications and alterations may occur to those skilled in the art which will come within the scope and spirit of the following claims.

I claim:

1. In a motor vehicle having a chassis frame, a drive aggregate resiliently mounted on said chassis frame, a pair of steerable road wheels laterally disposed relative to said drive aggregate, drive shaft means operatively interconnecting said wheels and said drive aggregate, a pair of wheel support members rotatably disposed relative to said wheels, a pair of laterally extending suspension arms interconnecting said drive aggregate and said wheel support members, transversely extending single leaf spring of uniform thickness interconnecting said wheel support members, said chassis frame being supported on said spring means at transversely spaced apart points, said spring means being connected to said chassis frame by mounting means adapted to permit deflection of said spring means without introducing a bending moment therein.

2. In a motor vehicle having a chassis frame, a drive aggregate, resilient means mounting said aggregate on said chassis frame, said resilient means having greater resiliency in a vertical direction than in a horizontal direction, a pair of steerable road wheels laterally disposed relative to said drive aggregate, drive shaft means operatively interconnecting said wheels and said drive aggregate, a pair of wheel support members rotatably disposed relative to said wheels, a pair of laterally extending suspension arms interconnecting said drive aggregate and said wheel support members, transversely extending leaf spring means interconnecting said wheel support members, said chassis frame supported on said spring means at transversely spaced apart points, said spring means being connected to said chassis frame by mounting means at each of said points constructed to permit deflection of said spring means without introducing a bending moment therein, said spring means having substantially uniform cross-sectional dimensions between said transversely spaced apart points.

3. In a motor vehicle having a chassis frame, a drive aggregate resiliently mounted on said chassis frame, a pair of steerable road wheels laterally disposed relative to said drive aggregate, drive shaft means operatively interconnecting said wheels and said drive aggregate, a pair of wheel support members rotatably disposed relative to said wheels, a pair of laterally extending suspension arms interconnecting said drive aggregate and said wheel support members, a transversely extending single leaf spring interconnecting said wheel support members, said chassis frame being supported on said spring at transversely spaced apart points, said spring being connected to said chassis frame by mounting means at each of said points constructed to permit deflection of said spring without introducing a bending moment therein, said mounting means comprising a band of rubber surrounding said spring, a band of metal surrounding said rubber, a pair of pivot pins extending from said metal transversely of said single leaf spring, a bracket secured to said chassis frame and pivotally supporting said pivot pins, the portion of said spring between said transversely spaced apart points having a substantially uniform cross section.

References Cited by the Examiner

UNITED STATES PATENTS

| | | | |
|---|---|---|---|
| 1,797,578 | 3/31 | Hoffman | 180—43 |
| 1,884,474 | 10/32 | Wolforth | 180—43 |
| 2,238,410 | 4/41 | Capuciati | 280—96.2 |
| 2,477,090 | 7/49 | Reeder et al. | 180—43 |
| 2,547,435 | 4/51 | Bouchard | 180—43 |
| 2,635,894 | 4/53 | Jackman | 280—96.2 |
| 2,697,613 | 12/54 | Giacosa | 267—19 |

FOREIGN PATENTS

| | | |
|---|---|---|
| 186,142 | 9/55 | Austria. |
| 1,009,361 | 5/52 | France. |
| 12,239 of 1912 | | Great Britain. |
| 774,211 | 5/57 | Great Britain. |

ARTHUR L. LA POINT, *Primary Examiner.*

A. HARRY LEVY, *Examiner.*